3,012,109
DEVICES FOR PROTECTING AND LUBRICATING ELECTRIC SHAVERS
George L. Beers, 410 Peyton Ave., Haddonfield, N.J.
Filed Sept. 5, 1957, Ser. No. 682,157
6 Claims. (Cl. 191—12.2)

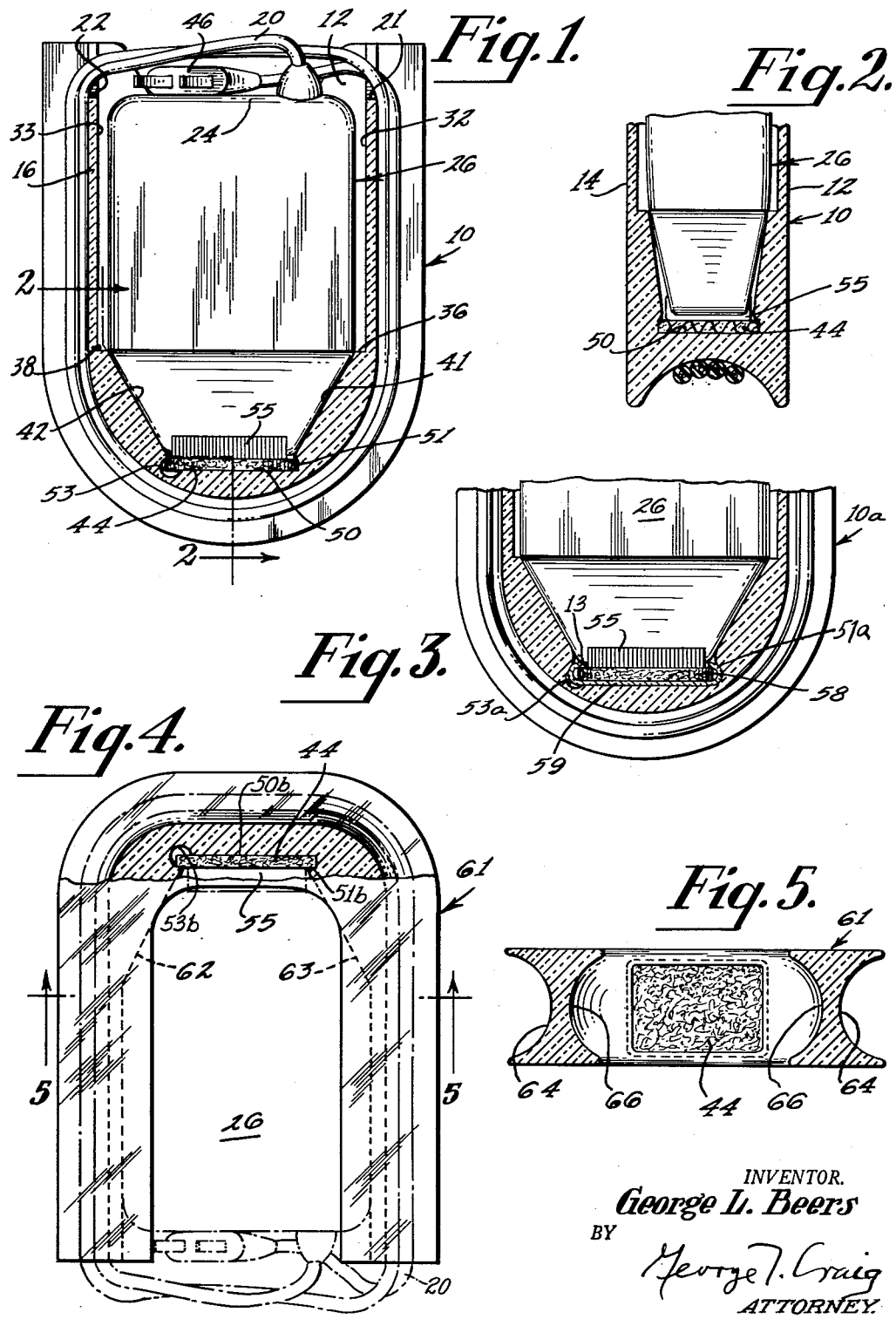

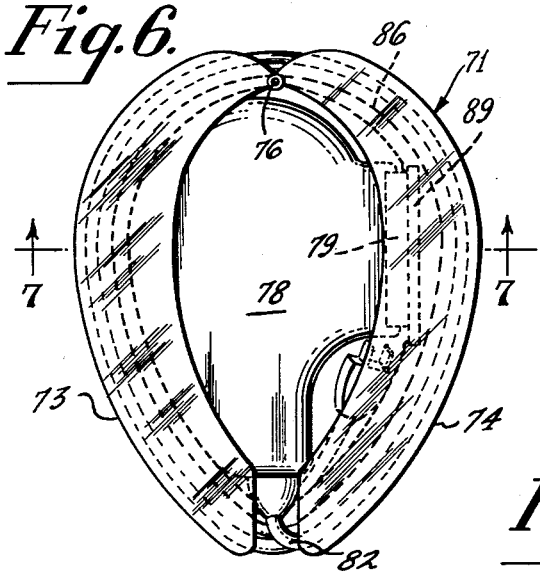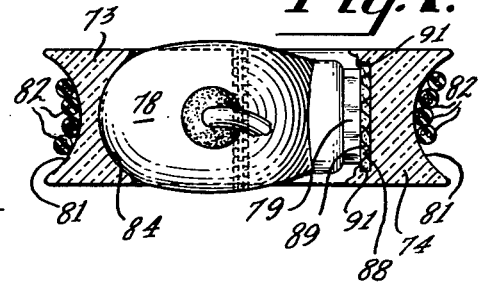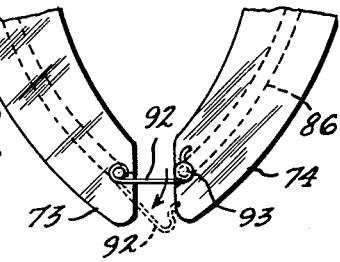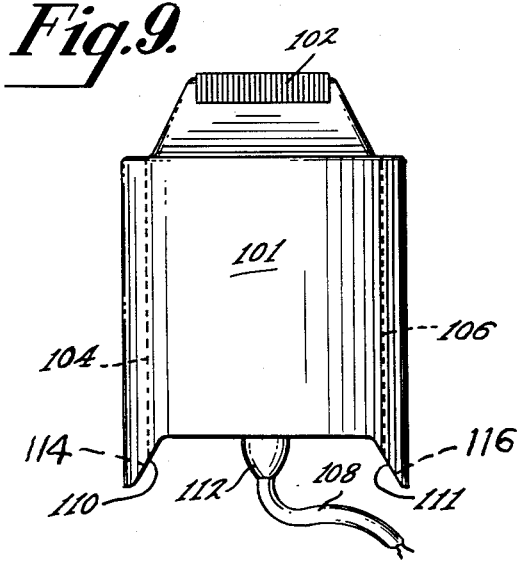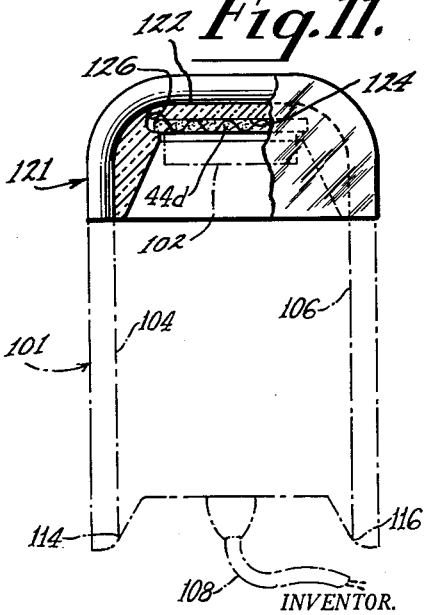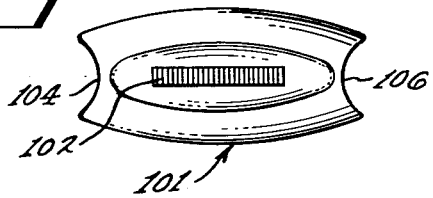
INVENTOR.
George L. Beers
BY
George J. Craig
ATTORNEY Dec. 5, 1961 G. L. BEERS 3,012,109
DEVICES FOR PROTECTING AND LUBRICATING ELECTRIC SHAVERS
Filed Sept. 5, 1957 3 Sheets-Sheet 3
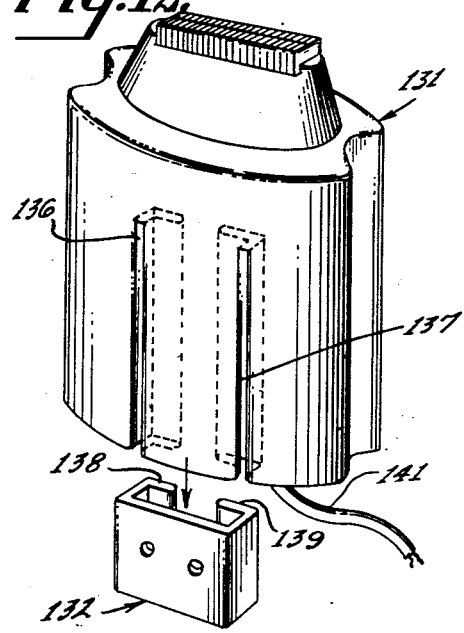
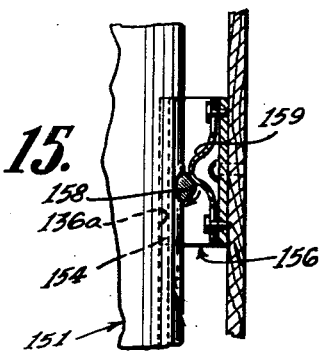
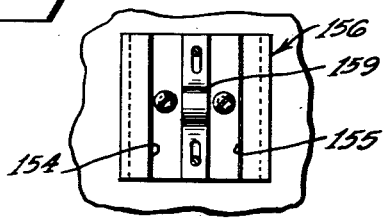
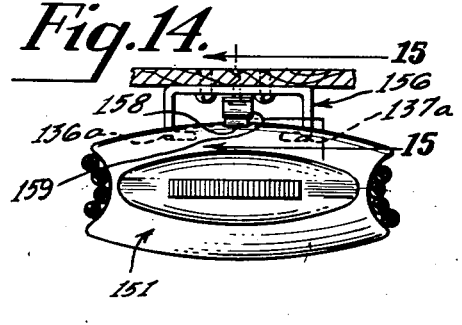
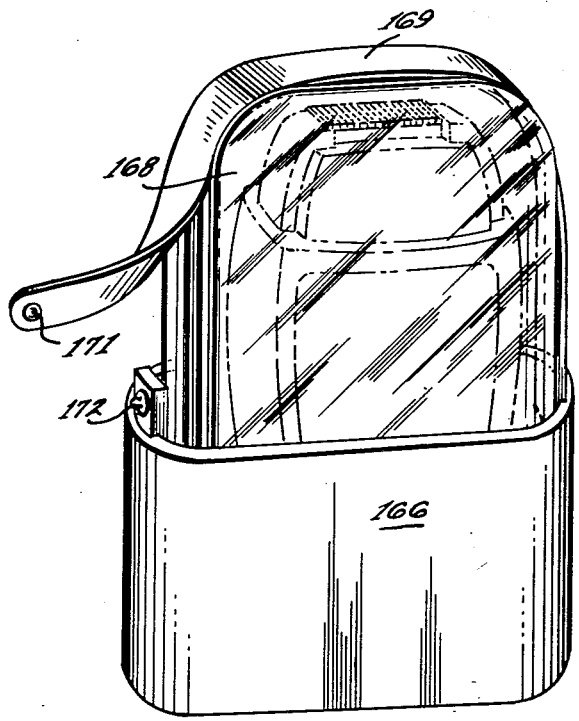
INVENTOR.
George L. Beers
BY
*George T. Craig*
ATTORNEY United States Patent Office 3,012,109
Patented Dec. 5, 1961

The present invention relates to electric shavers and more particularly to arrangements and devices for substantially increasing their convenience of use and improving their performance.

In certain aspects, thereof, the present invention incorporates improvements over features disclosed in Patent No. 2,773,663 granted to me on December 11, 1956.

Three of the problems which contribute to the inconvenience of using electric shavers are, protection of the cutting head, storage of the electric cord and lubrication.

In order to provide a close shave the cutting elements of an electric shaver are made of very thin metal and are consequently liable to damage when subjected to relatively light contact with some foreign object. Replacement of a damaged cutting head for many shavers represents a substantial portion of the total cost of the shaver. It is, therefore, necessary that the cutting head of electric shavers be protected at all times when not in use. Electric shavers are presently provided with a simple plastic or metal guard which is removed prior to shaving. Since this guard is small and fulfills no other function it is frequently misplaced thus leaving the shaver subject to damage.

The electric cord likewise contributes to the inconvenience of using an electric shaver. The packages or cases in which shavers are sold are intended primarily to appeal to the prospective customers' eye rather than provide a convenient means for storing the shaver and cord. These cases are generally so bulky and inconvenient to use that purchasers discard them immediately even though they represent a significant portion of the total cost of the shaver. At home the shaver user has the alternative of purchasing a wall mounting holder for his shaver which may have provision for coiling the cord on a reel or leaving the cord dangling from an outlet and storing the shaver on the shelf of the medicine cabinet in the bathroom.

The majority of electrical appliances used in the home today have the electric cord attached directly to the appliance. This avoids difficulties due to poor connections in plugs and receptacles and makes it impossible to misplace the electric cord. Due to the lack of a convenient means for storing the electric cord electric shavers are provided with a plug and receptacle so that the electric cord can be disconnected from the shaver. As a result of this arrangement many individuals have found themselves on a trip with an electric shaver but without the electric cord which will enable them to use it. It is an object of the present invention to provide a simple means for storing the electric cord for a shaver which will permit the cord to be connected permanently to the shaver without the usual plug and receptacle. The forgotten cord problem is thereby avoided.

Lubrication plays an important role in obtaining maximum satisfaction from many electric shavers. Electric shavers require moving parts in contact with each other to provide the shearing action. Friction therefore plays an important role in the operation of an electric shaver. Not only does friction slow down the action of the cutting head but it reduces the useful life of the cutting head through increased wear. A drop of oil on one's finger applied to the cutting head of many electric shavers will cause a very noticeable increase in the velocity of the cutting head indicating a substantial reduction in friction in the cutting head.

Some shaver manufacturers recommend that this be done once a week. Very few shaver users follow this recommendation because it is a messy procedure with the possibility of spilling oil on one's clothing, the floor covering or furniture.

Applying oil to the cutting head with the finger is unsatisfactory for another reason. Quite frequently too much oil is applied in this manner with the result that the residue from shaving tends to adhere to the moving parts and in a short time increases friction. Likewise if an excess is applied in this manner some of this excess is deposited on the face when shaving. To obtain optimum performance a very light film of oil should be applied to the cutting head each time the shaver is used.

In accordance with the present invention means are provided whereby the cutting heads of electric shavers are lubricated without any conscious effort on the part of the user. The shaver is lubricated each time it is used and the proper amount of oil is applied to the cutting head without any excess. The possibility of spilling oil on the clothing, furniture or bathroom rug is avoided. The lubricating feature functions equally well at home or traveling and the danger of getting oil on one's luggage or its contents is completely avoided.

In one embodiment of the invention the hollow receptacle and the cutting head of the electric shaver cooperate to form a complete enclosure in which is located the lubricating means in the form of a resilient material impregnated with a suitable lubricant. The surface of the resilient material applies a light film of oil to the cutting head. Since the cutting head and the resilient material containing the lubricant are effectively enclosed in a small compartment within the receptacle, any lubricant which evaporates will be deposited on the cutting head of the shaver and prevented from reaching other portions of the shaver or the electric cord where it may cause damage.

An object of the present invention is to provide for protection of the cutting head, storage of the electric cord, and lubrication of an electric shaver in an improved and novel manner.

Another object of the present invention is to provide a shaver having a novel configuration whereby to accommodate the shaver cord so that it is neatly held and readily accessible.

A further object of the present invention is to provide a novel guard for an electric shaver having means to store the shaver cord in a conveniently accessible manner.

A further object of the present invention is to provide a novel guard for an electric shaver having means to lubricate the cutting head of the shaver.

A still further object of the present invention is to provide a novel combined shaver holding bracket and switch control.

Other objects and advantages of the present invention will, of course, become apparent and immediately suggest themselves to those skilled in the art to which the invention is directed from a reading of the following specification in connection with the accompanying drawing in which:

FIG. 1 is a view in sectional elevation of a carrying case, which can serve as a combined holder and carrying case, for an electric shaver embodying the present invention in one aspect thereof, and showing a well known type of electric shaver accommodated in the case;

FIG. 2 is a fragmentary view in section on line 2—2 of FIG. 1, as viewed in the direction of the arrows;

FIG. 3 is a fragmentary view in section of a carrying case showing a modification of the invention of FIG. 1;

FIG. 4 is a view, partially in section, of an electric shaver shielding device and cord holder in accordance with the present invention which serves as a shield and is also in the nature of a "holder" and/or "carrying case";

FIG. 5 is a section on line 5—5, as viewed in the direction of the arrows, of the guard and cord holder of FIG. 4;

FIG. 6 is a view in side elevation of a novel electric shaver guard and cord holder of this invention accommodating another known type of shaver;

FIG. 7 is a view in section on line 7—7 of FIG. 6, as viewed in the direction of the arrows, of the guard and cord holder of FIG. 6;

FIG. 8 is a fragmentary view of a slight modification of the guard and cord holder of FIG. 6;

FIG. 9 is a view in side elevation of an electric shaver constructed to embody features of the present invention;

FIG. 10 is a view in plan of the shaver of FIG. 9;

FIG. 11 is an elevational view, partially in section, of a cutting head guard for the shaver of FIGS. 9 and 10;

FIG. 12 is a view in perspective of a shaver of this invention, similar to the shaver of FIGS. 9 and 10, together with a holding bracket;

FIG. 13 is a view in front elevation of a bracket having a switch operating feature secured to a supporting surface, such as a wall or the like;

FIG. 14 is a view in plan of a shaver and bracket similar to that of FIG. 12;

FIG. 15 is a fragmentary section on line 15—15 of FIG. 14 as viewed in the direction of the arrows; and FIG. 16 is a view in perspective of a separate pouch or case for receiving a shaver carrying case, for example, the case of FIG. 1.

Referring to FIGS. 1 and 2 of the drawing, a combined holder and carrying case, which may be referred to herein for convenience as a "holder" or as a "carrying case," having features of the above mentioned patent, is designated generally by reference character 10. In the form shown the holder comprises a front wall 12, a rear wall 14 and peripheral wall 16. The latter extends along three sides of the holder 10 leaving the top thereof open. The peripheral wall 16 is curved inwardly so as to provide a peripheral recess or groove to receive convolutions of the electric cord 20. As shown in FIGS. 1 and 2, the peripheral wall 16 ends at the locations 21 and 22 so as to raise the top runs of the cord convolutions above the bottom line 24 of an inverted shaver 26 inserted in the holder 10. This provides a space for the plug 46 and the flexibility of the cord holds it in place. The length of the cord is preferably such that the plug 46 comes at the top to be tucked in as shown.

FIG. 1 illustrates the inner configuration of the peripheral wall 16 which is designed to provide full support for the shaver 26. The substantially parallel sides 32 and 33 are spaced apart a sufficient to receive the body of the shaver 26. Shoulders 36 and 38 join the converging portions 41 and 42 of the inner configuration of the peripheral wall 16. The angle and location of each converging portion 41 and 42 is preferably selected to conform to the outline of the shaver 26 to be accommodated by the combined holder and carrying case 10.

An absorbent pad 44 is seated in a depression 50. The pad 44 may be formed by enclosing resilient material in a simple enclosure of metal, plastic or elastic material like neoprene to form in effect a miniature "stamp pad" containing a lubricant instead of ink. The depression is or may be generally rectangular and is slightly undercut on three sides as indicated by reference character 51. This serves to retain the pad 44 releasably in position. One end of the depression 50 is formed to provide a recess 53 extending inwardly so that the pad 44 slightly overhangs the inner lip of the recess. It is understood that the pad 44 and the depression 50 may be of any desired shape to conform to the surface of the cutting head of the shaver. The shaver 26 is included to illustrate the utility of the holder 10 in providing for lubrication of the shaver head 55. When the shaver 26 is removed from the holder 10, the pad 44 may readily be inserted by pressing it into the recess 53 so that it is retained by the lips of the three sided undercut 51. Removal of the pad 44 may be accomplished simply by pressing any pointed or narrow edged tool against the end of the pad 44 over the recess 53. Pressure applied by the tool will cause the opposite end of the pad to move in a vertical direction and be released from the lips of the undercut 51.

The pad may be provided with a charge of lubricant so that it is in a slightly moist condition thereby to impart the proper quantity of oil to the shaver head, avoiding an excess amount, when the shaving head is positioned against the pad in the holder 10. It is within the scope of the invention to provide pretreated pads so that after a period of time depending on the size of the pad and the type of lubricant employed the pad is no longer effective for lubrication purposes it can be discarded and replaced by a fresh pad. The lubricant may be of any suitable kind, for example that recommended by the manufacturer of a particular shaver which is to be accommodated in the holder 10.

Other means may be used for removing the pad 44 such as a small hole in the peripheral wall of the case 10. A hole (not shown) directly beneath the pad 44 makes it possible to exert, with a suitable tool, an upward pressure on the pad causing it to be released from the lips of the undercut 51. The edges of the pad 44 may be sufficiently resilient to provide the restraining force to keep the pad normally in place or the pad may be equipped with simple spring members for this purpose.

FIG. 3 of the drawing shows a holder 10a similar to the holder 10 of FIGS. 1 and 2. This holder is provided with an undercut portion 51a and a recess 53a. A pad 58 is shown which is provided with an elastic enclosure 59, open at the top, to provide for contact with the shaver head 55. The cover 59 may be of suitable material such as neoprene which can provide additional resiliency to aid in maintaining contact with the cutting head. Desirably, the material is impervious to oil or other liquid suitable for use with the pad 58. Elastic flanges or lips on the cover 59 as shown at 13 make contact with the body of the shaver in the region of the cutting head to effectively enclose the cutting head of the shaver in a small compartment with the resilient pad containing the lubricant. The pad 58 may be installed in and released from the holder 10a as pointed out in connection with FIGS. 1 and 2.

FIGS. 4 and 5 of the drawing disclose a shielding device 61 for an electric shaver. The shield 61 is generally of U-shaped and is provided with internal converging portions 62 and 63. The exterior of the shielding device 61 is curved inwardly so as to provide a peripheral recess or groove 64 to receive convolutions of the electric cord 20. The interior of the shielding device 61 is grooved as indicated at reference character 66 to conform to the shaver 26 to be protected by the shielding device 61. It will be understood that the configuration 66 will be designed to afford the proper fit for a particular shaver 26 which is to be protected by the shielding device 61. The end of the shielding device which receives the shaver head 55 has a depression 50b, an undercut section 51b, and a recess 53b which correspond in function to similar parts in FIGS. 1 and 2. A pad 44 is received in the depression 50b.

FIGS. 6, 7 and 8 disclose a modified electric shaver guard 71 of this invention. It is composed of two parts 73 and 74 hinged at 76. Reference character 78 designates a well known type of electric shaver having the cutting portion or cutting heads 79 disposed laterally of the body of the shaver. Each part of the shaver guard is recessed or grooved as indicated by reference character 81 to accommodate the shaver cord 82. The interior wall of the part 73 is grooved as indicated by reference character 84 so as to provide a proper fit against the case of the shaver 78. The part 74 is provided with a groove 86 similar to the groove 84. The groove 86 is interrupted by a depression 88 at and in the neighborhood of the shaving head 79. The depression 88 accommodates a pad 89 similar to the pad 44 of FIGS. 1 and 2. The depression 88 may be undercut as indicated at 91. The hinged guard of FIG. 6 is particularly suitable for shavers which are unsymmetrical. It minimizes the space required to store the shaver and cord and also protects and lubricates the cutting head.

FIG. 8 of the drawing is a fragmentary showing of a shaver guard such as shown in FIG. 6 but provided with a latch member or hook 92. The latter is pivoted on the part 73 and engages a pin 93 on the part 74 to retain the parts in the closed shaver engaging position. The latch 92 is provided where means for securing the parts together are desired in addition to the convolutions of the cord 82.

FIGS. 9 and 10 show a shaver constructed to embody features of the present invention. The shaver is designated by reference character 101 and may have any suitable internal mechanism for operating the cutting head 102. The latter may also be of any known kind effective for performing a shaving operation. The body of the shaver 101 is provided with grooves 104 and 106 so as to accommodate the shaver cord 108. The cord 108 ends in a cord plug or connection 112. The sides of the shaver are extended as indicated by reference characters 110 and 111 so that the end of the cord 108 is protected and also so that the cord will pass across without protrusion by reason of the notches 114 and 116 in the ends 110 and 111. If desired a flexible clip of metal or plastic can be incorporated in or attached to the body of the shaver in the space between the notches 114 and 116 to hold the cord plug firmly in place.

FIG. 11 shows a guard 121. The guard is grooved or recessed as indicated at 122 to accommodate the cord 108 when the guard is fitted to the shaver. The guard is so shaped that when attached to the shaver the grooves 104 and 106 are joined together by the groove in the guard to form a continuous groove extending from notch 114 in a clockwise direction to notch 116. The guard may be provided with slight inward projections in the region where it makes contact with the shaver. These projections are arranged to cooperate with corresponding recesses in the body of the shaver to hold the guard in place while the cord is being wound around the groove in the shaver and guard. The inside of the guard is provided with a depression 124. The depression is or may be undercut and is provided with a recess 126 so that pad 44d may be readily removed as explained above.

It will be apparent to those skilled in the art that the shape or form of the shaver 101 may be varied and still retain the features of the invention. For example, the ends of the recessed portion of the shaver which are designated 110 and 111 may be curved around the bottom of the shaver so that the recess more nearly encircles the shaver but still leaving an open space for the end of the cord 108 and the plug on the other end after the cord has been wound in the recess. Likewise, a recess can be made in the body of a shaver such as shown in FIG. 6. A guard similar in shape to the part 74 of FIG. 6 can be made with a recess which will cooperate with the recess in the body of the shaver to form a substantially continuous groove around the shaver and guard in which the electric cord can be wound.

The shape of the recess may also be varied as desired. For example, the recess in the shaver of FIG. 9 may be shaped to the outline of a finger or thumb so that the recess may be used to grip the shaver more securely and conveniently when shaving.

FIGS. 12 and 13 show a shaver 131 for use in combination with a bracket 132. The shaver 131 may be similar to the shaver 101 of FIG. 9. The shaver is grooved as indicated at 136 and 137 to be received by the lips 138 and 139 of the bracket 132. The bracket 132 may be secured to a surface such as the front of a cabinet or to a wall and the shaver 131 may be conveniently held by the bracket 132 when it is not in use. The cord 141 may be accommodated as pointed out previously herein. It will be noted that the grooves for attachment to the mounting bracket are so located with respect to the recess in the body of the shaver that the electric cord can be wound in the recess when the shaver is attached to a wall through the mounting bracket. It will likewise be apparent that the location, shape and size of the grooves in the body of the shaver are such that the grooves 136 and 137 impose no limitations in grasping the shaver while shaving.

FIGS. 13 to 15 disclose a shaver 151 which may be similar to the shavers 101 and 131. The shaver 151 is provided with grooves 136a and 137a to receive the lips 154 and 155 of a bracket 156. The shaver casing has a switch lever 158 projecting therefrom. As the shaver 151 is engaged with the bracket 156 the switch lever is turned to the off position by a switch operator 159. When the shaver is removed the switch operator is returned to the on position. The switch operator 159 is similar to the switch operator 130 of the patent referred to above.

FIG. 16 of the drawing shows a pouch or case 166 for receiving a shaver carrying case 168, for example the case of FIG. 1. The pouch or case 166 is provided with a retaining strap 169 which has a snap fastener button 171 thereon. The button 171 may be engaged with a snap fastener 172 so that the carrying case 168 is held in position with respect to the pouch 166. The retaining strap 169 is of proper width to fit within the outside edges of the recess in the case 168 so that the strap completely covers the convolutions of the electric cord when the cord is wound around the case as illustrated in FIG. 1. The pouch or case 166, as shown, then serves as a closure for the open end of the carrying case 168, or the like. The retaining strap 169 may be provided with an elastic or spring member such as is frequently used on binocular cases so that the strap is kept neatly in place at all times. The spring member may be incorporated in the opposite end of the strap from the button 171 so that it is concealed by the case 166. The carrying case 168 may be of transparent plastic with the result that the details of the shaver are clearly visible yet the cord is hidden from view and all the convenience features previously discussed are retained. It will also be apparent that the case 166 can be employed to advantage with the shaver and guard combination shown in FIGS. 9, 10 and 11.

What is claimed is:

1. In an electric shaver, the combination of a body, a cutting head on said body, an electric cord associated with said body and a guard for said cutting head removably associated with said body and adapted to fit over said cutting head to protect said head from contact with foreign objects, said body and said guard each having a peripheral groove therein, the groove in said body having dimensions which permit the placing of a finger therein to hold said shaver securely, the groove in said guard being a continuation of the groove in said body when said guard is applied to said body over said cutting head to form a groove which extends around a sufficient portion of the periphery of said shaver to enable said cord to be wound and retained therein.

2. In an electric shaver, the combination of a body, a cutting head on said body, an electric cord associated with said body and a guard for said cutting head removably associated with said body, said guard having a hollow interior of a shape conforming substantially to the outline of the cutting head of said shaver, said body and said guard each having a peripheral groove therein, the groove in said body having dimensions which permit the placing of a finger therein to hold said shaver securely, the groove in said guard being a continuation of the groove in said body when said guard is applied to said body over the cutting head to form a groove which extends around a sufficient portion of the periphery of said shaver to enable said cord to be wound and retained therein.

3. A removable guard for the cutting head of an electric shaver comprising a receptacle having a hollow interior of a shape conforming substantially to the outline of the cutting head of an electric shaver to be enclosed therein, said hollow interior shaped to provide a space between the walls of the receptacle and the cutting head of an electric shaver to which said guard is attached, removable lubricating means in the space between the walls of said receptacle and the cutting head, means to retain said removable lubricating means in a position to lubricate the cutting head of an electric shaver when said guard is attached to a shaver and means permitting the removal of said lubricating means when the lubricant in said lubricating means is exhausted.

4. A removable guard for the cutting head of an electric shaver provided with an electric cord, said guard comprising a receptacle having a hollow interior of a shape conforming substantially to the outline of the cutting head of the electric shaver to which said guard is attached, the walls of said receptacle shaped to provide a space between the inner surface of said receptacle and the cutting head of the electric shaver, resilient lubricating means in the space between the walls of said receptacle and the cutting head, said guard shaped to effectively enclose all of said cutting head and all of said lubricating means and means to position and retain said guard in place on the electric shaver when said guard is placed on such shaver.

5. A removable guard for the cutting head of an electric shaver provided with an electric cord, said guard comprising a receptacle having a hollow interior of a shape conforming substantially to the outline of the cutting head to be enclosed therein, said hollow interior shaped to provide a space between the walls of the receptacle and the cutting head of the electric shaver to which said guard is attached, lubricating means in the space between the walls of said receptacle and the cutting head, resilient means for maintaining contact between said lubricating means and said cutting head, and said guard shaped to effectively enclose all of said cutting head and all of said lubricating means, means including a portion of said guard defining a space adjacent said guard for storing said electric cord and the walls of said guard forming a barrier between said lubricating means and said electric cord when said cord is located in said space.

6. In an electric shaver, the combination of a body, a cutting head on said body, an electric cord associated with said body and a guard for said cutting head removably associated with said body, said guard having a hollow interior of a shape conforming substantially to the outline of the cutting head of said shaver, the walls of said receptacle shaped to provide a space between the inner surface of said receptacle and the cutting head of said electric shaver, lubricating means in the space between the walls of said receptacle and the cutting head, resilient means for maintaining contact between said lubricating means and said cutting head when said guard is attached to the said electric shaver, said body and said guard each having a peripheral groove therein, the groove in said guard being a continuation of the groove in said body when said guard is applied to said body over the cutting head to form a groove which extends around a sufficient portion of the periphery of said shaver to enable said cord to be wound and retained therein.

References Cited in the file of this patent

UNITED STATES PATENTS

| | | |
|---|---|---|
| 1,615,396 | Lorenz | Jan. 25, 1927 |
| 2,143,529 | White | Jan. 10, 1939 |
| 2,157,257 | Crum | May 9, 1939 |
| 2,196,786 | Wahl | Apr. 9, 1940 |
| 2,350,048 | Kobler et al. | May 30, 1944 |
| 2,383,031 | Wilson | Aug. 21, 1945 |
| 2,551,859 | Thompson | May 8, 1951 |
| 2,636,264 | Ganzer | Apr. 28, 1953 |
| 2,662,719 | Hammond | Dec. 15, 1953 |